United States Patent
Bill

(10) Patent No.: US 12,350,981 B2
(45) Date of Patent: Jul. 8, 2025

(54) AIRCRAFT TIRE MONITORING DEVICE

(71) Applicant: AIRBUS OPERATIONS LIMITED, Bristol (GB)

(72) Inventor: Andrew Bill, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 25 days.

(21) Appl. No.: 18/299,594

(22) Filed: Apr. 12, 2023

(65) Prior Publication Data
US 2023/0331049 A1 Oct. 19, 2023

(30) Foreign Application Priority Data

Apr. 13, 2022 (GB) .................................. 2205507

(51) Int. Cl.
*B60C 23/04* (2006.01)
*B64D 45/00* (2006.01)

(52) U.S. Cl.
CPC .......... *B60C 23/0479* (2013.01); *B64D 45/00* (2013.01); *B64D 2045/0085* (2013.01)

(58) Field of Classification Search
USPC .......... 340/960, 442, 445, 907, 10.1, 407.1, 340/539.1, 815.45, 917, 944, 447, 438, 340/945
See application file for complete search history.

(56) References Cited

U.S. PATENT DOCUMENTS

| | | |
|---|---|---|
| 7,095,316 B2 | 8/2006 | Kachouh |
| 7,508,299 B2 | 3/2009 | Thomas |
| 8,599,044 B2 * | 12/2013 | Maggiore ........... B60C 23/0479 340/447 |
| 8,997,560 B2 | 4/2015 | Martin |
| 10,035,609 B2 | 7/2018 | Ziarno |
| 11,240,751 B2 | 2/2022 | Strahan |
| 11,358,420 B2 | 6/2022 | Boisset |
| 11,597,244 B2 | 3/2023 | Dages |
| 11,623,519 B2 | 4/2023 | Jahns |
| 11,872,855 B2 | 1/2024 | Bill |

(Continued)

FOREIGN PATENT DOCUMENTS

| | | |
|---|---|---|
| EP | 1 702 770 A2 | 9/2006 |
| EP | 2 842 771 A1 | 3/2015 |

(Continued)

OTHER PUBLICATIONS

Combined Search and Examination Report cited in GB 2205505.7, dated Aug. 31, 2022, 7 pages.

(Continued)

*Primary Examiner* — Daniel Previl

(74) *Attorney, Agent, or Firm* — Nixon & Vanderhye P.C.

(57) ABSTRACT

An aircraft tire monitoring device including a wireless communication interface and configured to operate in a first mode in which the wireless communication interface is periodically activated and available for connection to a remote device with a first interval between activations, and a second mode in which the wireless communication interface is periodically activated and available for connection to the remote device with a second interval between activations. The second interval between activations is different to the first interval between activations.

22 Claims, 8 Drawing Sheets

(56) References Cited

U.S. PATENT DOCUMENTS

| | | | |
|---|---|---|---|
| 2003/0122660 A1* | 7/2003 | Kachouh | B60C 23/0408 340/445 |
| 2006/0220815 A1* | 10/2006 | Thomas | B60C 23/0416 340/447 |
| 2008/0018494 A1* | 1/2008 | Waite | H05B 47/19 340/407.1 |
| 2009/0102635 A1 | 4/2009 | Massoni et al. | |
| 2016/0082791 A1 | 3/2016 | Lin | |
| 2017/0259942 A1* | 9/2017 | Ziarno | F02C 9/00 |
| 2021/0029634 A1 | 1/2021 | Strahan et al. | |
| 2021/0039450 A1* | 2/2021 | Dages | B60C 23/0459 |
| 2021/0245559 A1* | 8/2021 | Boisset | B60C 23/0454 |
| 2023/0331048 A1 | 10/2023 | Bill | |

FOREIGN PATENT DOCUMENTS

| | | |
|---|---|---|
| EP | 3 118 030 A1 | 1/2017 |
| GB | 2 584 849 A | 12/2020 |
| JP | 2013248916 | 12/2013 |
| WO | 2004037566 | 5/2004 |
| WO | 2010119066 | 10/2010 |
| WO | 2019086706 | 5/2019 |

OTHER PUBLICATIONS

Combined Search and Examination Report cited in GB 2205507.3, dated Aug. 31, 2022, 6 pages.

European Search Report cited in EP 23167430.0 mailed Sep. 18, 2023, 8 pages.

European Search Report cited in EP 23167429.2 mailed Sep. 15, 2023, 8 pages.

U.S. Appl. No. 18/299,164—Office Action (Mar. 14, 2025).

* cited by examiner

AIRCRAFT TIRE MONITORING DEVICE

RELATED APPLICATION

This application incorporates by reference and claims priority to United Kingdom patent application GB 2205507.3, filed Apr. 13, 2022.

TECHNICAL FIELD

The present invention relates to an aircraft tire monitoring device, and a method of operating an aircraft tire monitoring device.

BACKGROUND

Checking tire pressure is an important part of the maintenance of a vehicle. Tire pressures should be maintained at predetermined pressures to ensure that a tire performs as intended by the manufacturer.

SUMMARY

A first aspect of the present invention provides an aircraft tire monitoring device comprising a wireless communication interface, the aircraft tire monitoring device configured to operate in a first mode in which the wireless communication interface is periodically activated and available for connection to a remote device with a first interval between activations, and a second mode in which the wireless communication interface is periodically activated and available for connection to the remote device with a second interval between activations different to the first interval between activations.

It may be desirable to operate an aircraft tire monitoring device in a mode where a wireless communication interface is activated and available for connection to a remote device at a relatively high frequency, i.e., with a relatively small interval between activations, to facilitate relatively quick connection of the aircraft tire monitoring device to the remote device. However, activation of the wireless communication interface at a relatively high frequency may lead to increased battery consumption where the aircraft tire monitoring device is a battery operated device.

By operating in the first and second modes according to the first aspect of the present invention, power consumption of the aircraft tire monitoring device may be reduced by selectively switching between modes of operation where the wireless communication interface is activated more or less frequently, compared to, for example, solely operating in a mode where the wireless communication interface is activated at a relatively high frequency. When the aircraft tire monitoring device is battery powered, this can lead to an increase in battery life, for example.

Optionally, the wireless communication interface is configured to listen for a connection request from the remote device when the wireless communication interface is activated. Optionally, the wireless communication interface is configured to transmit a connection signal for facilitating connection of the aircraft tire monitoring device to the remote device when the wireless communication device is activated.

Optionally, the connection signal comprises an identifier associated with the respective aircraft tire monitoring device.

Optionally, the aircraft tire monitoring device is configured to operate in the first mode based at least in part on a determination that the remote device is not within a communicative range of the wireless communication interface, to operate in the second mode based at least in part on a determination that the remote device is within the communicative range of the wireless communication interface, and wherein the second interval between transmissions is less than the first interval between transmissions.

Optionally, the communicative range of the wireless communication interface is less than or equal to 100 m, less than or equal to 75 m, less than or equal to 50 m, less than or equal to 25 m, or less than or equal to 10 m.

Optionally, the first interval is at least 10 seconds, at least 20 seconds, or at least 30 seconds.

Optionally, the second interval is less than 5 seconds, less than 4 seconds, less than 3 seconds, less than 2 seconds, or less than 1 second.

Optionally, the aircraft tire monitoring device is configured to operate in the first or second mode based at least in part on a status of the remote device, wherein the status of the remote device comprises at least one of: the remote device is powered on, the remote device has an active wireless communication interface, and the remote device is running a predetermined application. Optionally, the status of the remote device comprises any of whether the remote device is turned on or off, whether a communications channel of the remote device is activated, and whether a pre-determined application is running on the remote device or not.

Optionally, the aircraft tire monitoring device is configured to operate in a third mode in which the wireless communication interface is periodically activated and available for connection to the remote device with a third interval between activations different to the first interval and the second interval. Optionally the third interval is greater than the second interval and/or greater than the first interval.

Optionally, the aircraft tire monitoring device is configured to operate in the first, second, or third mode based at least in part on an operational condition of an aircraft to which the aircraft tire monitoring device is attached in use.

Optionally, the aircraft tire monitoring device is configured to determine the operational condition of the aircraft based at least in part on one or more parameters measured by the aircraft tire monitoring device.

Optionally, the operational condition of the aircraft comprises whether the aircraft is located on ground or in the air.

Optionally, the aircraft tire monitoring device is configured to operate in the first, second, or third mode based at least in part on historical operation of the aircraft tire monitoring device in one or more of the first, second, or third modes.

Optionally, the aircraft tire monitoring device is configured to operate in the second mode based at least in part on a time since the aircraft tire monitoring device last operated in the second mode.

Optionally, the aircraft tire monitoring device comprises an aircraft tire pressure sensor.

A second aspect of the present invention provides an aircraft comprising an aircraft tire monitoring device according to the first aspect of the present invention.

A third aspect of the present invention provides a method of operating an aircraft tire monitoring device, the method comprising: operating the aircraft tire monitoring device in a first mode in which the wireless communication interface is periodically activated and available for connection to a remote device with a first interval between activations; and operating the tire monitoring device in a second mode in which the wireless communication interface is periodically activated and available for connection to the remote device with a second interval between activations different to the first interval between activations.

Optionally, the method comprises switching from the first mode to the second mode based at least in part on a determination that the remote device is within communicative range, and the second interval is greater than the first interval.

Optionally, the method comprises switching from the first mode to the second mode based at least in part on a status of the remote device.

Optionally, the method comprises operating the aircraft tire monitoring device in a third mode in which the wireless communication interface is periodically activated and available for connection to the remote device with a third interval between activations lower than the first and second intervals.

Optionally, where the aircraft tire monitoring device is attached to an aircraft in use, the method comprises switching from the first mode to the third mode in response to take-off of the aircraft.

Optional features of aspects of the present invention may be equally applied to other aspects of the present invention, where appropriate.

BRIEF DESCRIPTION OF THE DRAWINGS

Embodiments of the invention will now be described, by way of example only, with reference to the accompanying drawings, in which.

DETAILED DESCRIPTION

Figure 1:
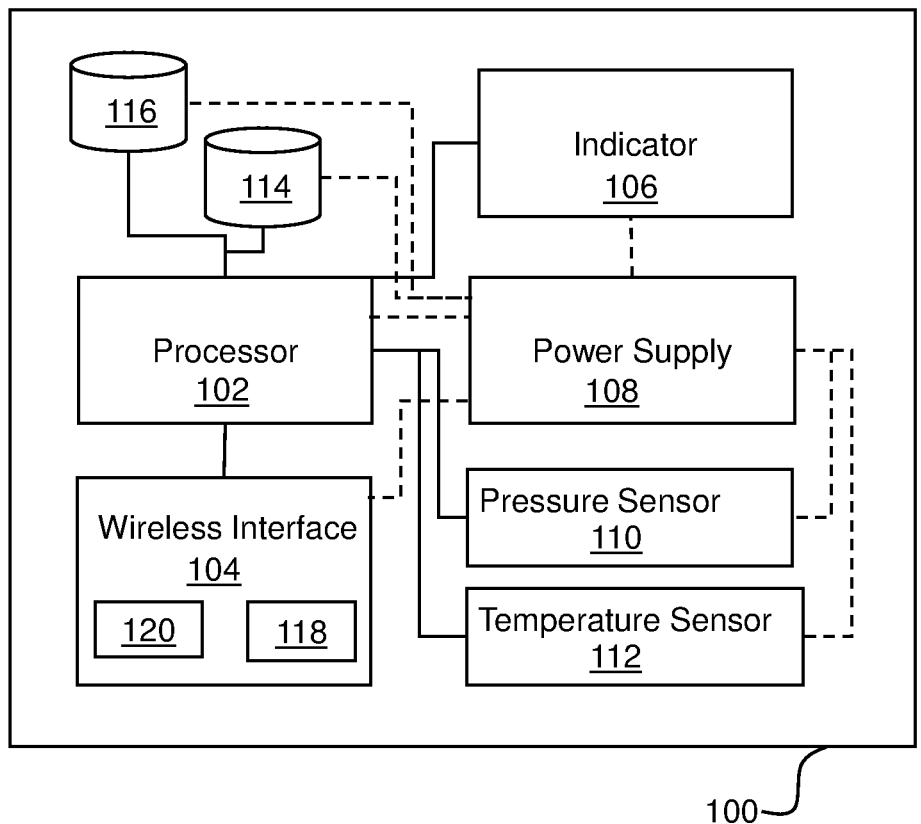
FIG. 1 shows a schematic view of an aircraft tire monitoring device.

An aircraft tire monitoring device 100 in accordance with the present invention is illustrated schematically in FIG. 1, in the form of a tire pressure monitoring device. The tire monitoring device 100 is configured for mounting on a wheel, for example by a mechanical connection to an opening on the wheel providing access to the tire. The tire monitoring device 100 includes a processor 102, a wireless communication interface 104, an indicator 106, a power supply 108, a pressure sensor 110, a temperature sensor 112, a first storage 114 and a second storage 116.

Processor 102 may be any suitable processing device including a microprocessor with one or more processing cores. In use, processor 102 coordinates and controls the other components and may be operative to read and/or write computer program instructions and data from/to the storage 114, 116. The processor 102 may be optimized for low power operation or have at least one processing core optimized for low power operation in some examples.

Wireless communication interface 104 is connected to the processor 102 and is used to both transmit and received data from the other devices of the tire pressure sensor system. In this example, the wireless communication interface 104 includes two transceivers, 118, 120 which both use different wireless technology. A first transceiver 118 is provided for relatively long-range communication, up to about 50 m or about 100 m. For example, the first transceiver 118 may use a communication standard suitable for mobile devices, such as IEEE 802.15.1, IEEE 802.15.4, IEEE 802.11 (Wi-Fi) on either the 2.4 GHz or 5 GHz Industrial Scientific and Medical (ISM) bands or a Wireless Avionics Intra-Communications (WAIC) standard. The first transceiver 118 also includes an encryption module for encrypting sent data and decrypting received data, for example according to the Advanced Encryption Standard (AES) utilizing pre-shared keys. A second transceiver 120 is provided for relatively short-range communications. For example, the second transceiver 120 may use a standard according to IEEE 802.15, such as IEEE 802.15.4, RFID or Near Field Communication (NFC). The second transceiver 120 may operate over a range of less than 5 m, less than 3 m, less than 1 m, less than 50 cm, less than 25 cm, less than 10 cm, less than 5 cm, less than 1 cm or requiring contact between devices. Like the first transceiver 118, the second transceiver 120 also includes an encryption module for encrypting sent data and decrypting received data.

In some examples, a single wireless transceiver may be provided in the wireless communication interface 104. In that case the single transceiver may use relatively short range or relatively long range communication, or adjust the range (such as by controlling transmit power) as required.

Indicator 106 is connected to the processor 102 and controlled by the processor 102 to provide indications to a user of the tire monitoring device 100. In this example the indicator 106 is an LED, but in other examples the indicator is another form of light, a display, such as an LCD or e-ink display, or any other form of visual indication. In other examples, the indicator 106 is an audible indicator, such as a buzzer, beeper, speaker or any other sound generating component. In further examples, the indicator 106 can comprise both audible and visual indication components. The indicator 106 provides at least first and second indications, for example a first colour and a second colour of emitted light. Further indications can also be provided, such as solid or flashing light. The tire monitoring device 100 has a housing (not shown) and the indicator 106 can provide an indication outside the housing, for example the LED may be mounted external to the housing or visible through the housing, or sound may be able to be emitted from within the housing.

The power supply 108 provides power to the elements of the tire monitoring device 100. The power supply 108 may be a battery, such as Lithium battery. In this example, the power supply 108 is a Lithium battery with power sufficient to run the sensor in normal operation for about 2 to 3 years. In other examples the power supply 108 may comprise a power harvesting system, for example harvesting vibration and/or electromagnetic radiation to charge a capacitor or battery which is then used to power the device.

The pressure sensor 110 is connected to processor 102 and may be any suitable sensor for measuring pressure, for example a capacitive sensor. Similarly, the temperature sensor 112 is connected to processor 102 and may be any suitable sensor for measuring temperature, such as thermocouple. The temperature sensor 112 may be arranged to measure the temperature of the wheel or the temperature of the gas inside the tire directly. Where the temperature sensor 112 measures the temperature of the wheel, this can be processed to determine the temperature of the gas in the tire. For example, an algorithm or look-up table may be used.

The connection of the pressure sensor 110 and temperature sensor 112 to the processor 102 may be digital, providing a digital representation of the measured pressure and/or temperature from an Analogue to Digital Convertor (ADC) in the sensor itself, or analogue, in which case the processor may include an ADC to sample the received signal. Including both a pressure sensor 110 and a temperature sensor 112 may be useful to determine a temperature compensated pressure value. Although this example includes a pressure sensor 110 and a temperature sensor 112, other examples may include only a pressure sensor, or may include further sensors.

This example includes two storage elements 114 and 116. Storage 114 is non-volatile rewritable storage in this example, such as flash memory which can retain data without requiring applied power. Other examples may include volatile storage, which is kept powered by the power supply, or combinations of read-only and rewritable storage. Storage 114 is connected to the processor 102 and used to store both computer program instructions for execution by the processor and data, such as data from the pressure sensor 110 or received over the wireless communication interface 104. In some examples, storage 114 may store a history of pressure and/or temperature readings sensed by the pressure sensor 110 and the temperature sensor 112. For example, the previous ten days readings may be stored, with the newest data replacing the oldest once the storage is full.

Storage 116 is secure storage to which write and/or read access is restricted, for example only accessible to certain processes running on processor 102. Configuration data, such as wireless encryption keys can be stored in storage 116. In other examples, a single storage may be provided, or storage 114 and 116 may be provided in a single physical device with a logical partitioning between storage 114 and storage 116.

Figure 2:
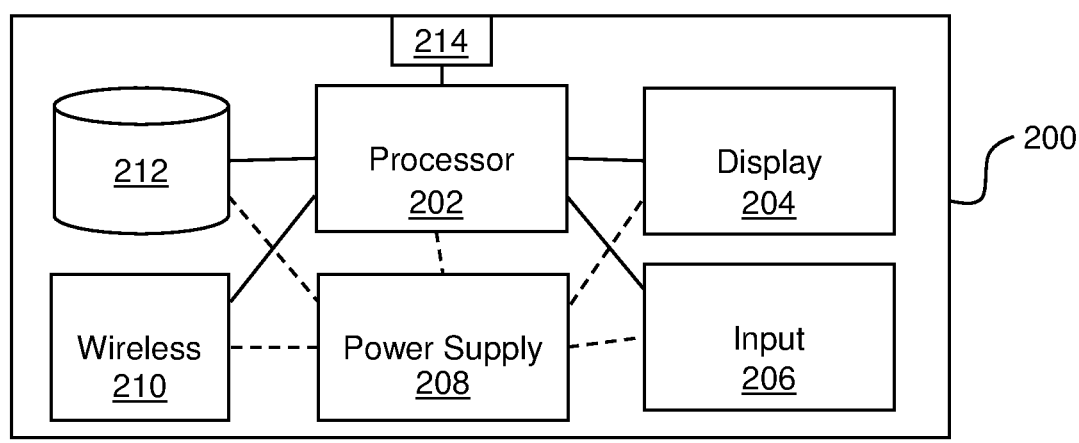
FIG. 2 shows a schematic view of a remote device.

FIG. 2 shows a schematic representation of a remote device 200 for use in conjunction with the tire monitoring device 100 of FIG. 1. The remote device 200 includes a processor 202, a display 204, an input system 206, a power supply 208, a wireless communication interface 210, a storage 212 and wired communication interface 214. In this example the remote device 200 is a mobile device, such as a cellular phone or a tablet computer.

The processor 202 is any suitable processing device, for example a multipurpose microprocessor, system-on-chip, or system in package, which may include one or more processing cores. Processor 202 is connected to the display 204, such an LCD, OLED or e-ink display to display information to a user of the remote device 200.

Input system 206 includes a touch screen interface in this example, allowing a user to interact with the remote device 200 by touching user interface elements on the screen. The input system 206 may include one or more buttons in addition to the touch screen, as well as other input devices, such as a microphone for speech recognition and a camera for image input. Other examples may not include a touch screen interface.

The remote device is powered by power supply 208, which is a rechargeable lithium-ion battery in this example. Other examples may use alternative power supplies, such as other battery technologies, mains power, or energy harvesting, such as solar power.

A wireless interface 210 is included for the remote device 200 to communicate with other devices, such as the tire monitoring device 100. In this example, a single wireless interface 210 is provided which is configured to communicate with the tire monitoring device 100. For example, a relatively long range wireless communication technology can be used, such as one conforming to IEEE 802.15.1, IEEE 802.15.4 or IEEE 802.11. This allows the remote device 200 to interact with the tire monitoring device 100 from a relatively long range.

In other examples, the remote device 200 may be provided with multiple wireless communication interfaces or transceivers, operating with different wireless technologies, such as at least two of IEEE 802.15.1, IEEE 802.15.4, IEEE 802.11 (Wi-Fi), WAIC, RFID and NFC. For example, the remote device 200 may have two transceivers with one having a longer communication range than the other.

Storage 212 includes a non-volatile element, such as flash memory, and a volatile element, such as RAM. The non-volatile element is used to store operating system software and application software. In this example, the remote device 200 runs standard operating system software and is loaded with application software to interact with the tire monitoring device 100. In order to restrict access to the tire monitoring device 100, the application software may be provided from a secure source and not available to the general public, and/or require credentials to be entered before operating.

Wired communication interface 214 is provided for connection to a computing system. The wired communication interface 214 can be for example, a serial data connection, such as Universal Serial Bus (USB), a parallel data connection or a network connection, such as Ethernet. The wired communication interface 214 may allow the remote device 200 to communicate values and/or other status information read from the tire monitoring device 100 to a computing system, for example to store long term trends and assist fleet management. Alternatively, or additionally, wired communication interface 214 may be used for communication with the computing system. In some examples, the remote device 200 may not include a wireless communication interface.

Figure 3:
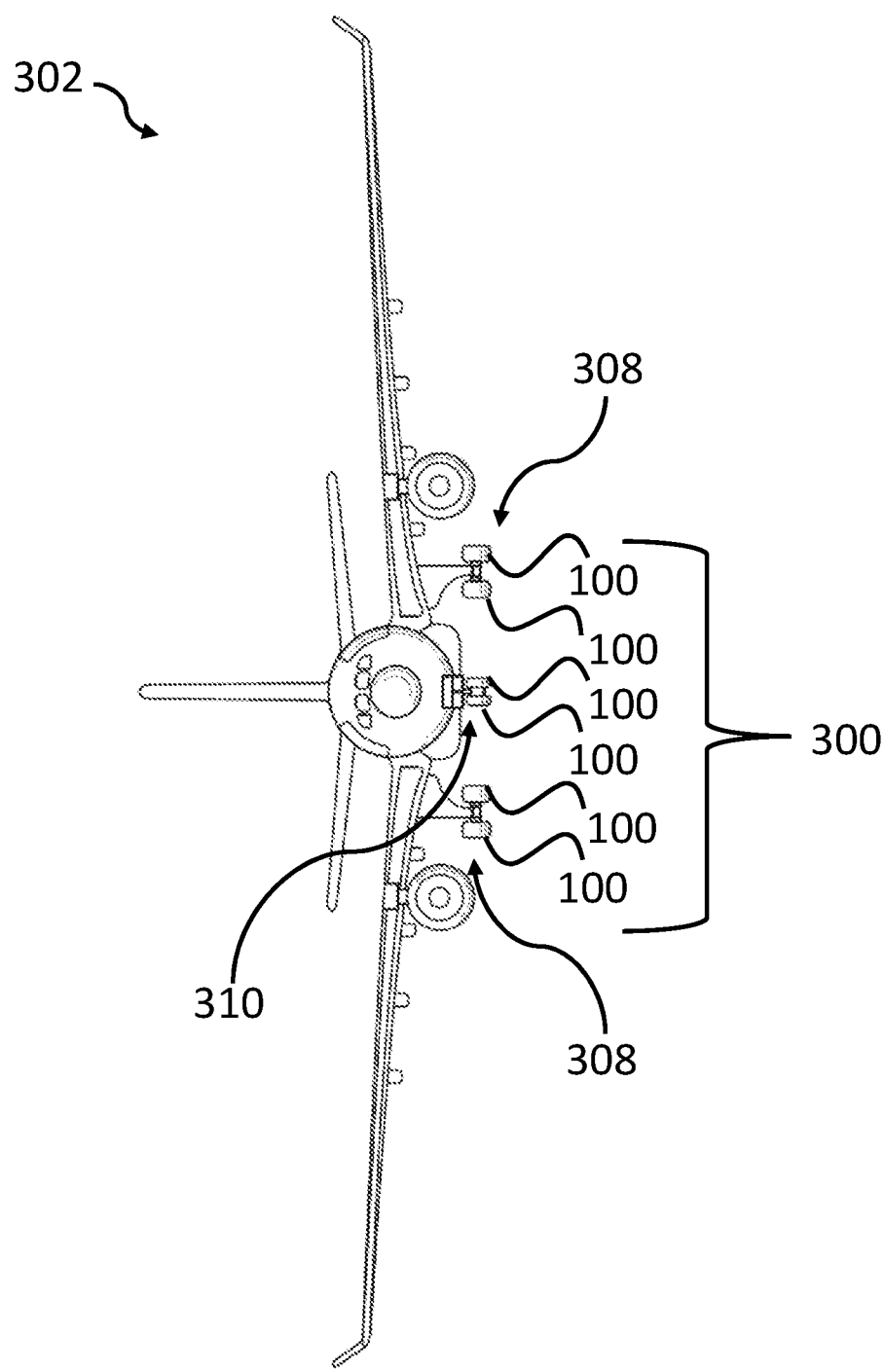
FIG. 3 shows a schematic view of an aircraft.

FIG. 3 shows a schematic representation of a tire pressure sensor network 300 comprising a plurality of tire monitoring devices 100 installed in an aircraft 302. The aircraft 302 comprises main landing gear 308 and nose landing gear 310. The aircraft 302 may be used in conjunction with any of the methods described herein. Tire monitoring devices 100 are installed on each wheel of the main landing gear 308 and nose landing gear 310.

In an example, the tire monitoring devices 100 are also in communication with a cockpit system to provide tire pressure information to the pilots on the flight deck. In these examples, the flight deck console may also function as a remote device.

Figure 4:
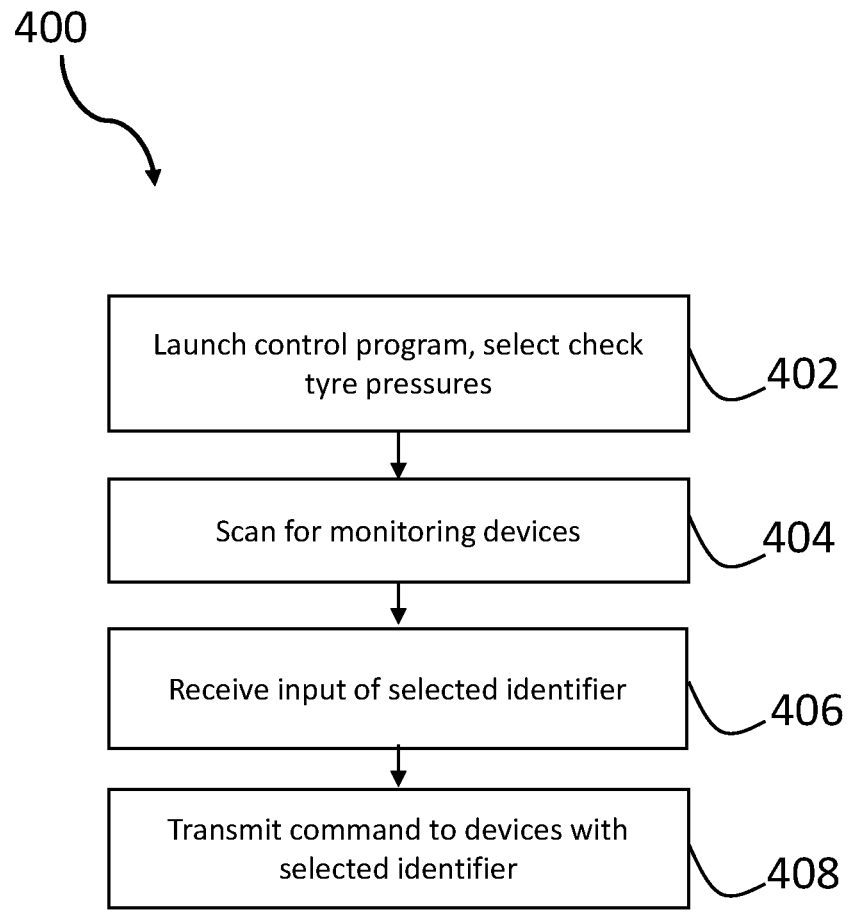
FIG. 4 shows a first method according to an example.

FIG. 4 shows a flow chart of a tire pressure check process that can be used with the tire pressure sensor network 300 of FIG. 3. First, at block 402, a user launches the tire monitoring control application on the remote device 12. During initialization of the application, a check is made that the wireless communication interface 210 for communication with the tire monitoring devices 100 is active on the remote device 200 and the user is prompted to activate if it is not active.

Next, at block 404, the remote device 200 scans for tire monitoring devices 100 in range. For example, the remote device 200 may send out a probe over the wireless communication interface 210. At the same time, the tire monitoring devices 100 are periodically waking and listening for the probe of the remote device, and/or periodically waking and broadcasting respective identification signals, which include aircraft identifiers, such as a tail identifier of an aircraft to which the tire monitoring device 100 is attached.

The scanning may comprise establishing direct, point-to-point contact with each tire monitoring device 100, or contact through the network 300 of tire monitoring devices 100, for example through an access point, a master device, or any device in a mesh network.

Depending on the communication range and location, tire monitoring devices associated with more than one aircraft may be detected. For example, several aircraft may be in the same hanger in range of the remote device 200. At block 406, input is received of a selected identifier.

Next, at block 408, a request or command is sent to the tire monitoring devices 100 corresponding to the selected identifier to cause them to connect to the remote device 200, for example so that they can receive a request from the remote device 200 to carry out a tire pressure check.

Throughout the process of FIG. 4, communication between the remote device 200 and the tire monitoring devices 100 may be secure, for example encrypted by a network key. The network key for the communication with the remote device may be different from the network key used for communication between the sensor devices to enhance the security of the system.

Security may be increased by using a wireless communication technology with a limited transmission distance when exchanging secure keys, for example 802.11 (Wi-Fi) standards may allow transmission over a distance of 50 m or further in clear space. This alone may be sufficient to provide increased security because physical proximity is required to intercept communications. In some examples, security may be increased by reducing transmission power when encryption keys are transmitted compared to transmission of the encrypted data itself, requiring closer proximity for the initial key exchange process.

Synchronisation

In the tire pressure sensor network 300, the tire monitoring devices 100 may generally operate in a low power mode in which a majority of the components of the tire monitoring device 100 are turned off, including the wireless communications interface 104. Where the tire monitoring devices 100 operate in such a low power mode, with the wireless communications interface 104 inactive, the tire monitoring devices 100 may be unavailable to connect to the remote device 200. The tire monitoring devices 100 may be required to "wake" and periodically activate their respective wireless communications interface 104 to enable connection to the remote device 200 to occur.

Figure 5:
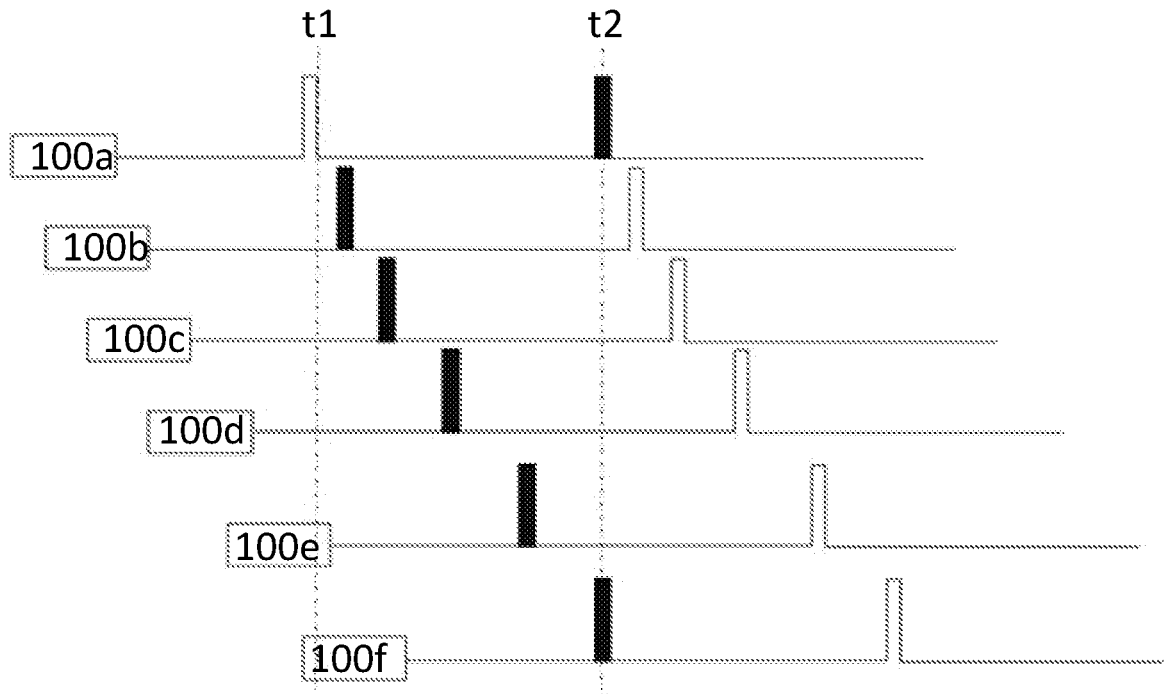
FIG. 5 shows a first timing diagram illustrating connection of aircraft tire monitoring devices to a remote device.

In some instances, such as the case illustrated schematically in FIG. 5, tire monitoring devices 100*a*-100*f* within the network 300 can operate such that their respective wireless communication interfaces 104 are active at different times relative to one another. This can, however, increase a length of time taken to connect to the remote device 200, for example where connection of the remote device 200 to the tire monitoring devices 100 is desired to perform a tire pressure check, as at block 410 in the method of FIG. 4. For example, in FIG. 5 a connection request 502 begins to be sent by the remote device 200 to the tire monitoring devices 100 at a first time t1. However, not all of the tire monitoring devices 100 have their wireless communications interfaces 104 active at the time t1, and so connection of all tire monitoring devices 100 to the remote device 200 does not occur until a later time t2. In FIG. 5, the point at which each tire monitoring device connects to the remote device is shown in black. A worst case occurs when a connection request from the remote device closely follows an active period, as shown for device 100*a* in FIG. 5, where t1 is just after an active period for one of the tire monitoring devices, so that all the devices can only be connected (shown in black in FIG. 5) once that device has become active again. The probability of this worst case occurring increases with the number of tire monitoring devices in the system.

Figure 6:
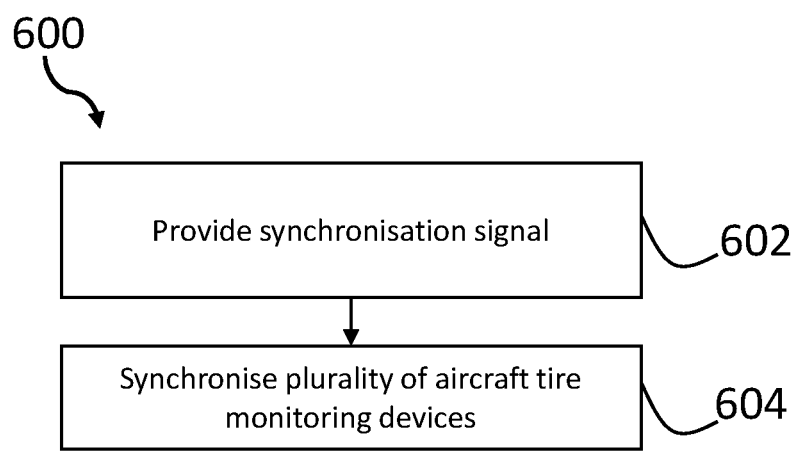
FIG. 6 shows a second method according to an example.

To mitigate for such delays, a method 600 in accordance with the present disclosure is illustrated in the flow diagram of FIG. 6. The method 600 comprises providing 602 a synchronisation signal, and, in response to the synchronisation signal, synchronising 604 the plurality of aircraft tire monitoring devices 100 such that each of the plurality of aircraft tire monitoring devices 100 is available to connect to a remote device in a same time interval.

By synchronising the plurality of aircraft tire monitoring devices 100 such that each of the plurality of aircraft tire monitoring devices 100 is available to connect to the remote device 200 in a same time interval, time delays in connecting the remote device 200 to the plurality of aircraft monitoring devices 100 may be minimised relative to an arrangement where the plurality of aircraft tire monitoring devices are available to connect to the remote device in different time intervals. This may reduce a time taken for a tire pressure check to be performed by an operator of the remote device 200.

Figure 7:
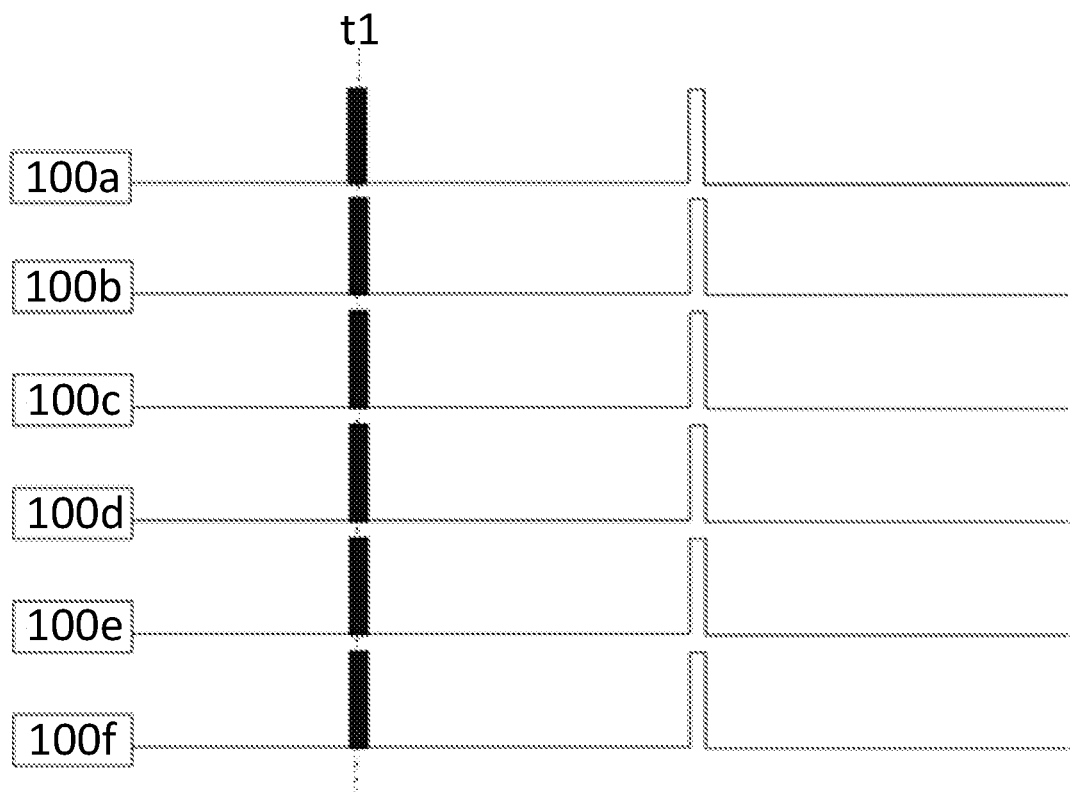
FIG. 7 shows a second timing diagram illustrating connection of aircraft tire monitoring devices to a remote device.

Use of the method 600 results in the plurality of aircraft tire monitoring devices 100 being available to connect to the remote device 200 in a same time interval, with such a scenario being illustrated in FIG. 7. Here a connection request is sent by the remote device 200 to the tire monitoring devices 100*a*-*f* at a first time t1, with all tire monitoring devices able to connect to the remote device 200 substantially concurrently with the first time t1. While FIG. 7 shows a best case in which the connection request at t1 coincides with the tire monitoring devices being available for connection, the method 600 generally reduces connection times whenever the connection request begins at t1 relative to the timing of the tire monitoring devices being available. It can be seen from FIG. 5 that, when the timing of the tire monitoring devices being available for connection is not synchronised, the time to connect is more likely to be close to time interval between the tire monitoring devices being available. Furthermore, the probability of the worst case occurring, where the connection request begins just after a period of availability does not increase with the number of the tire monitoring devices in the system as it does with unsynchronised tire monitoring devices.

In some examples, synchronisation of the tire monitoring devices 100 may be performed during initial configuration of the network 300 of tire monitoring devices 100 when installed on the aircraft 302. Here the remote device 200 may be utilised to configure the network 300, with the remote device 200 sending a synchronisation signal to the tire monitoring devices 100 to cause synchronisation to occur. In some examples, synchronisation of the tire monitoring devices 100 may be performed when it is desired for a tire pressure check to be performed, for example each time a tire pressure check is to be performed synchronisation may occur. Here the remote device 200 may be utilised to send a synchronisation signal to the tire monitoring devices 100 to cause synchronisation to occur once an identifier has been received from the tire monitoring devices 100, e.g. in response block 404 of the method of FIG. 4, or the remote device 200 may be utilised to send the synchronisation signal once an identifier has been selected, e.g. in response to block 406 of the method of FIG. 4.

The synchronisation signal in some examples is broadcast by the remote device 200 to each of the plurality of aircraft tire monitoring devices 100, whilst in other examples the remote device 200 sends the synchronisation signal to a single one of the plurality of aircraft tire monitoring devices 100, with that tire monitoring device then causing synchronisation of the remaining aircraft tire monitoring devices 100. In further examples, the remote device 200 may send the synchronisation to each of the plurality of aircraft tire monitoring devices 100 independently, such as by including a timing relative to a shared time reference.

The synchronisation signal can cause the processor 102 of the respective aircraft tire monitoring devices 100 to set instructions regarding activation and deactivation of the wireless communications interface 104. It will be appreciated that the synchronisation signal may cause synchronisation of the plurality of aircraft tire monitoring devices 100 in a number of ways. For example, the synchronisation signal can cause the processor 102 to set any of a start of the time interval, an end of the time interval, and a duration of the time interval. In some examples the synchronisation signal can set operation of the aircraft tire monitoring devices 100 to be available for connection to the remote device 200 relative to an internal clock signal of the respective aircraft tire monitoring devices 100. The time interval may be relatively short, for example to avoid the wireless communications interface 104 being unnecessarily active for prolonged periods of time, and in some examples the time interval may be no more than 5 seconds.

The plurality of aircraft tire monitoring devices 100 can act passively, actively, or a combination of the both, during the time interval. In a passive state the aircraft tire monitoring devices 100 listen for a connection request from the remote device 200 in the time interval, whereas in an active state the aircraft tire monitoring devices 100 transmit their own respective connection signal during the time interval. In some examples the aircraft tire monitoring devices 100 can listen for a connection request from the remote device 200 in the time interval, and then, when the connection request is received in the time interval, the aircraft tire monitoring devices 100 can transmit their respective connection signals to the remote device 200. Such transmission of the connection signals can occur substantially concurrently. Connection signals of the aircraft tire monitoring devices 100 can include identifiers of the respective aircraft tire monitoring devices 100.

Once connection of the aircraft tire monitoring devices 100 to the remote device 200 has occurred, the aircraft tire monitoring devices 100 can be utilised to perform a tire monitoring procedure, in this case a tire pressure check. Such a tire pressure check can occur automatically in response to connection of the aircraft tire monitoring devices 100 to the remote device 200, or alternatively connection of the aircraft tire monitoring devices 100 to the remote device 200 can enable a tire pressure check to occur. For example, the remote device 200 can be used by an operator to send requests to the aircraft tire monitoring devices 100 to provide indications of the pressures measured by their respective pressure sensors 110. The aircraft tire monitoring devices 100 can then display, using their respective indicators 106, an indication as to whether the measured pressures are within thresholds of reference pressure values, or can alternatively display, via a sequence of flashes of the indicator 106 a value of a measured pressure.

Via the synchronisation discussed above, the time taken for a tire pressure check to occur may be reduced relative to a scenario where no synchronisation occurs.

It will be appreciated that, in general, once a connection to a remote device is established, the wireless interface will generally remain active until the connection is disconnected and/or until a time-out period elapses without communication with the remote device. The synchronisation therefore reduces the overall time because the time to initially establish a connection is reduced.

Variable Wake Period

As discussed above, In the tire pressure sensor network 300, the tire monitoring devices 100 may generally operate in a low power mode in which a majority of the components of the tire monitoring device 100 are turned off, deactivated, or otherwise in a low-power state, including the wireless communications interface 104. Where the tire monitoring devices 100 operate in such a low power mode, with the wireless communications interface 104 inactive, the tire monitoring devices 100 may be unavailable to connect to the remote device 200, and unable to obtain tire pressure measurements. The tire monitoring devices 100 may be required to "wake" and periodically activate their respective wireless communications interface 104 to enable connection to the remote device 200 to occur, and/or to obtain tire pressure measurements.

One particular example of occurs around the time of block 404 described in relation to the method of FIG. 4 above. Here the remote device 200 scans for tire monitoring devices 100 in range, and the aircraft tire monitoring devices 100 are periodically waking and listening for the probe of the remote device, and/or periodically waking and broadcasting respective identification signals, which include aircraft identifiers, such as a tail identifier of an aircraft to which the tire monitoring device 100 is attached.

To facilitate connection of the remote device 200 to the plurality of aircraft tire monitoring devices 100, it may be desirable to operate the aircraft tire monitoring devices 100 in a mode where the wireless communication interface 104 is activated and available for connection to the remote device 200 at a relatively high frequency, i.e. with a relatively small interval between activations, to facilitate relatively quick connection of the aircraft tire monitoring device 100 to the remote device 200. However, activation of the wireless communication interface 104 more frequently may lead to increased power consumption, which has a direct effect on service life where the aircraft tire monitoring device 100 is a battery operated device, and may also cause greater power draw than can be replenished through energy harvesting techniques where the aircraft tire monitoring device 100 includes an energy harvesting system.

Figure 8:
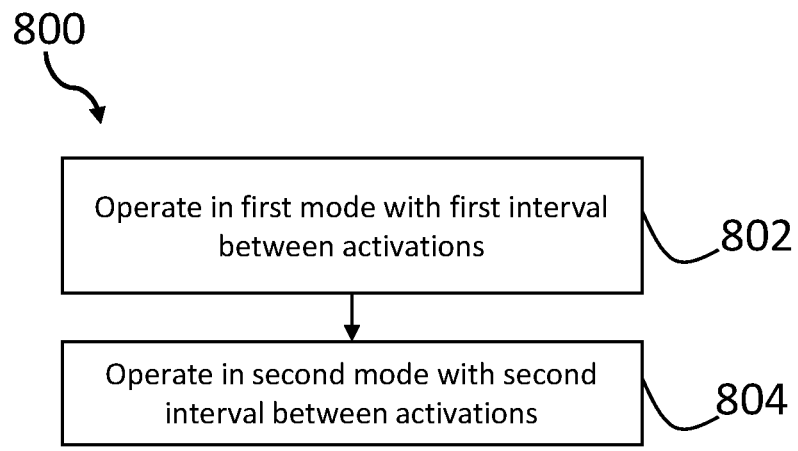
FIG. 8 shows a third method according to an example.

Thus, a method 800 in accordance with the present disclosure will be described with reference to the flow diagram of FIG. 8.

The method 800 comprises operating 802 an aircraft tire monitoring device 100 in a first mode in which the wireless communication interface 104 is periodically activated and available for connection to the remote device 200 with a first interval between activations, and operating 804 the tire monitoring device 100 in a second mode in which the wireless communication interface 104 is periodically activated and available for connection to the remote device 200 with a second interval between activations different to the first interval between activations.

By operating in the first and second modes according to the first aspect of the present invention, power consumption of the aircraft tire monitoring device 100 may be reduced by selectively switching between modes of operation where the wireless communication interface 104 is activated more frequently or less frequently, compared to, for example, solely operating in a mode where the wireless communication interface 104 is activated at a relatively high frequency.

In some examples the first interval can comprise at least 10 seconds, at least 20 seconds, or at least 30 seconds. In some examples the second interval can comprise not more than 5 seconds, no more than 4 seconds, no more than 3 seconds, no more than 2 seconds, or no more than 1 second.

Figure 9:
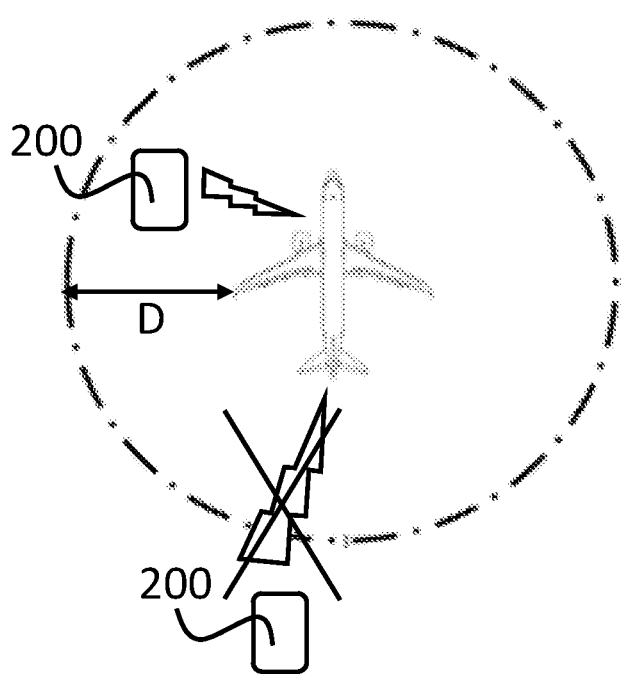
FIG. 9 shows a schematic illustration of communication between a remote device and an aircraft tire monitoring device.

In some examples, the aircraft tire monitoring device 100 is configured to operate in the first and second modes based on a proximity of the remote device 200 to the aircraft tire monitoring device 100. For example, where the remote device 200 is not within communicative range of the wireless interface 104 of the aircraft tire monitoring device 100, the aircraft tire monitoring device 100 operates in a first mode with a relatively long interval between activations, and where the remote device 200 is within communicative range of the wireless interface 104 of the aircraft tire monitoring device 100, the aircraft tire monitoring device 100 operates in a second mode with a relatively short interval between activations. By increasing the frequency at which the wireless communication interface 104 is activated where the remote device 200 is within communicative range of the wireless interface 104 of the aircraft tire monitoring device 100, speed of connection to the remote device 200 may be increased without unduly increasing power consumption of the aircraft tire monitoring device 100, for example avoiding undue burden on a battery. This switch in modality is shown schematically in FIG. 9, with the communicative range denoted D.

References to frequency of activating the wireless interface refer to how frequently the wireless interface is activated and available to receive connection requests, it does not refer to the carrier frequency over which wireless communication takes place using the wireless interface.

In some examples, as discussed above, the wireless communications interface 104, e.g. the first transceiver 118, can be configured to operate at a range of up to 100 m, and hence a switch from the first mode to the second made can occur when the remote device 200 is within 100 m or less of the aircraft tire monitoring device 100.

The switch between the first and second modes can also be dependent on other criteria. Such criteria include a status of the remote device 200, for example whether the remote device is on or off, whether the wireless communications interface 210 of the remote device 200 is on or off, and whether the remote device 200 is running a particular application or not. Any combination of these criteria may be utilised. For example, one or more of the aircraft tire monitoring devices 100 may switch from its first mode to its second mode where the remote device 200 is within communicative range of the wireless interface 104 of the aircraft tire monitoring device 100, the remote device 200 is turned on, the wireless communications interface 210 of the remote device 200 is active, and the remote device 200 is running a particular application, e.g. an application associated with performing a tire pressure check utilising the aircraft tire monitoring device 100.

These criteria can be assessed or evaluated in a variety of ways. For example, during the time that the wireless communication interface 104 is active, the presence of the remote device 200 may be deduced by listening for active transmissions on the wireless band. In some examples such transmissions may be received and at least partially read by the aircraft tire monitoring device 100. The remote device 200 may send periodic beacons indicating its presence and/or possibly indicating other information, such as an application identifier of an application associated with performing a tire pressure check. Communications over the wireless communication band intended for other devices may also be examined, and information gained from them, for example, use of particular communication parameters associated with the remote device 200 (such as TCP port number) and/or header information, such as a sender MAC address known to be associated with remote devices 200, can indicate the presence of the remote device 200 in communicative range.

A further criterion that may be utilised to determine a switch of an aircraft tire monitoring device 100 from a first mode with a relatively long interval between activations of the wireless communications interface 104, to a second mode with a relatively short intervals between activations of the wireless communications interface 104, includes a time period since the aircraft tire monitoring device 100 last operated in the second mode. For example, pressure checks may be mandated to be performed on aircraft tires at a predefined frequency, say every three days. Accordingly, the aircraft tire pressure monitoring devices 100 can, in some examples, be configured to operate in the second mode once a pre-determined time period, e.g., three days, has elapsed since the aircraft tire monitoring device 100 last operated in the second mode, in anticipation of a tire pressure check needing to be performed. In such circumstances, the aircraft tire monitoring device 100 can operate in the second mode until connection to the remote device 100 occurs.

As an extension of the above, the aircraft tire monitoring device 100 can also be configured to learn frequencies and/or dates/time in which the aircraft tire monitoring device 100 operates in the second mode, such that the aircraft tire monitoring device 100 can predictively switch from the first to second mode.

In some examples, one or more of the aircraft tire monitoring devices 100 can be configured to operate in a third mode in which the wireless communication interface 104 periodically activated and available for connection to the remote device 200 with a third interval between activations different from, for example greater than, the first and second intervals. Such a third mode of operation can provide further flexibility in power saving, and in some examples operation in the third mode can be based at least in part on an operational condition of the aircraft 302.

For example, where the aircraft 302 is in flight, connection to the remote device 200 to perform a tire pressure check may be extremely unlikely to occur, and in such a circumstance the aircraft tire monitoring devices can operate in the third mode with relatively large intervals between activations of the wireless communications interfaces 104. Indeed, in some examples there may be no activations of the wireless communications interfaces 104 when the aircraft 302 is in flight.

Figure 10:
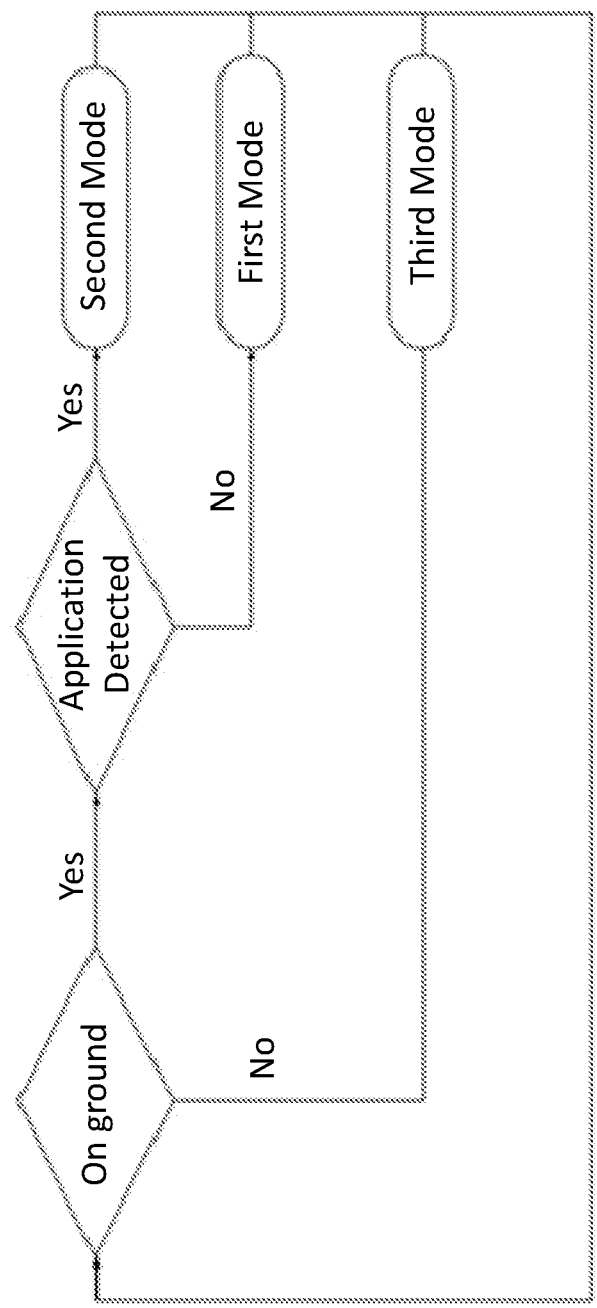
FIG. 10 shows a flow diagram illustrating modes of operation of aircraft tire monitoring devices.

A flow diagram illustrating an example operation of an aircraft tire monitoring device 100 in the first, second and third modes is shown in FIG. 10. Here, where the aircraft 302 is not on the ground, i.e., in-flight, the aircraft tire monitoring device 100 operates in the third mode in which the wireless communications interface 104 is activated relatively infrequently. Where the aircraft 302 is on the ground, the aircraft tire monitoring device 100 operates in either the first mode or the second mode based on whether a particular tire monitoring application is detected running on the remote device 200. If the application is not detected, the aircraft tire monitoring device 100 operates in the first mode in which the wireless communications interface 104 is activated with a relatively middling frequency. If the application is detected, the aircraft tire monitoring device 100 operates in the second mode in which the wireless communications interface 104 is activated with a relatively high frequency.

In such a manner the aircraft tire monitoring device 100 may be available relatively frequently for connection to the remote device 200 when the aircraft 302 is on the ground, and the remote device 20 is within communicative distance and running the appropriate tire pressure monitoring application. Otherwise, the aircraft tire monitoring device 100 may activate its wireless communications interface 104 less frequency, thereby saving battery.

In some examples, the aircraft tire monitoring device 100 can be configured to locally determine the operating condition of the aircraft 302, i.e., whether the aircraft 302 is in-flight or on the ground, or indeed which phase of on-ground operation the aircraft is in. In addition to waking such that the aircraft tire monitoring device 100 is available for connection to the remote device 200, aircraft tire monitoring devices 100 can also periodically wake to obtain pressure and temperature measurements using the pressure sensor 110 and the temperature sensor 112. Such pressure and temperature measurements can be utilised by the aircraft tire monitoring device 100 to infer the operating condition of the aircraft 302.

Figure 11:
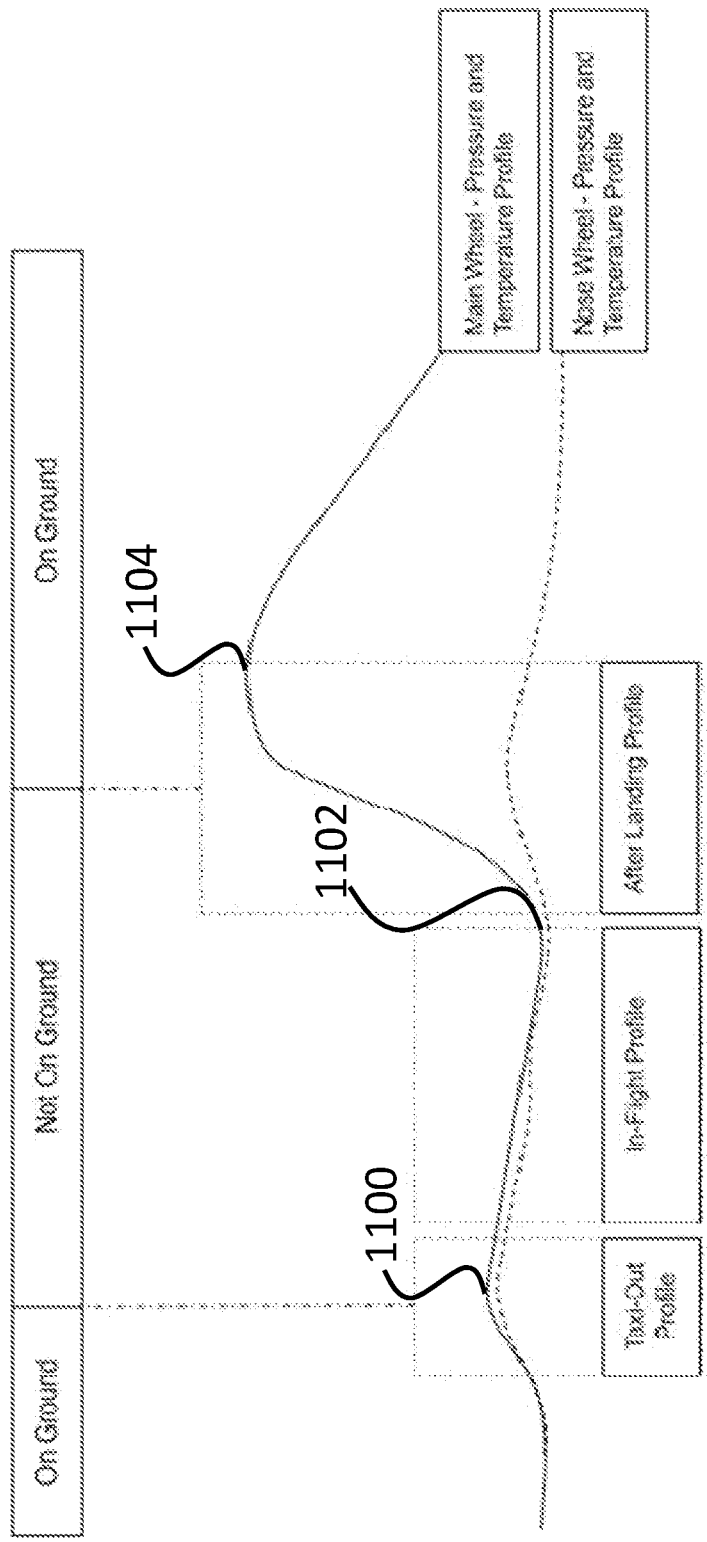
FIG. 11 shows an example pressure/temperature profile for an aircraft.

An example pressure/temperature profile for a tire of the aircraft 302 in different operating conditions is illustrated schematically in FIG. 11. Here it can be seen that when the aircraft 302 is on-ground, the pressure/temperature profile rises to a local maximum 1100 during taxi-out of the aircraft 302. When the aircraft 302 is in-flight, the pressure/temperature profile decreases from the local maximum 1100 to a local minimum 1102. When the aircraft 302 lands, the pressure/temperature profile increases from the local minimum 1102 to a global maximum 1104, before decreasing again. Such pressure/temperature profiles may be utilised by the aircraft tire monitoring devices 100 to determine whether to operate in the first, second or third modes, with the third mode occurring in-flight and the first and second modes occurring when the aircraft 302 is on the ground. For example, transitions between "in-flight" and "on-ground" may refer to a gradient of the pressure and temperature over time as well as absolute values.

In some examples, the aircraft tire monitoring devices 100 may reset to an on-ground setting in response to contact with the remote device 200, e.g. contact with the remote device 200 when the remote device 200 is running the pre-determined tire monitoring application, or may reset to an on-ground setting a pre-determined time period after an in-flight setting is determined. This may inhibit the aircraft tire monitoring device 100 from becoming stuck in an in-flight mode of operation.

It will be recognised that the variable wake period discussed above, e.g., the first, second and third modes of operation, may be compatible with the synchronisation steps also discussed herein. For example, the plurality of aircraft tire monitoring devices 100 may be configured to operate in any of the first, second, and third modes, in which the wireless communication interface 104 is activated and available to connect to the remote device 200, with the aircraft tire monitoring devices being synchronised to be available for connection within a same time interval whilst operating in the first, second, or third mode.

It is noted that the term "or" as used herein is to be interpreted to mean "and/or", unless expressly stated otherwise.

The invention claimed is:

1. An aircraft tire monitoring device comprising:
    a wireless communication interface,
    the aircraft tire monitoring device configured to operate:
        in a first mode in which the wireless communication interface is periodically activated from an inactive state to be available for connection to a remote device with a first interval between activations, and
        in a second mode in which the wireless communication interface is periodically activated from the inactive state to be available for connection to the remote device with a second interval between activations different to the first interval between activations,
        wherein while in the inactive state the wireless communication interface is not available for connection to the remote device.

2. The aircraft tire monitoring device according to claim 1, wherein the aircraft tire monitoring device is configured:
    to operate in the first mode based at least in part on a determination that the remote device is not within a communicative range of the wireless communication interface, and
    to operate in the second mode based at least in part on a determination that the remote device is within the communicative range of the wireless communication interface,
    wherein the second interval between transmissions is less than the first interval between transmissions.

3. The aircraft tire monitoring device according to claim 2, wherein the communicative range of the wireless communication interface is no more than 100 meters.

4. The aircraft tire monitoring device according to claim 3, wherein the aircraft tire monitoring device is configured to operate in a third mode in which the wireless communication interface is periodically activated and available for connection to the remote device with a third interval between activations greater than the first interval between activations.

5. The aircraft tire monitoring device according to claim 1, wherein the first interval is at least 10 seconds.

6. The aircraft tire monitoring device according to claim 1, wherein the second interval is less than 5 seconds.

7. The aircraft tire monitoring device according to claim 1, wherein the aircraft tire monitoring device is configured to operate in the first mode or the second mode based at least in part on a status of the remote device, wherein the status of the remote device comprises at least one of: the remote device is powered on, the remote device has an active wireless communication interface, and the remote device is running a predetermined application.

8. The aircraft tire monitoring device according to claim 1, wherein the aircraft tire monitoring device is configured to operate in a third mode in which the wireless communication interface is periodically activated and available for connection to the remote device with a third interval between activations different to the first interval and the second interval.

9. The aircraft tire monitoring device according to claim 8, wherein the aircraft tire monitoring device is configured to operate in the first, second, or third mode based at least in part on an operational condition of an aircraft to which the aircraft tire monitoring device is attached in use.

10. The aircraft tire monitoring device according to claim 9, wherein the aircraft tire monitoring device is configured to determine the operational condition of the aircraft based at least in part on one or more parameters measured by the aircraft tire monitoring device.

11. The aircraft tire monitoring device according to claim 9, wherein the operational condition of the aircraft comprises whether the aircraft is located on ground or in flight.

12. The aircraft tire monitoring device according to claim 8, wherein the aircraft tire monitoring device is configured to operate in the first, second, or third mode based at least in part on historical operation of the aircraft tire monitoring device in one or more of the first, second, or third modes.

13. The aircraft tire monitoring device according to claim 1, wherein the aircraft tire monitoring device is configured to operate in the second mode based at least in part on a time since the aircraft tire monitoring device last operated in the second mode.

14. The aircraft tire monitoring device according to claim 1, wherein the aircraft tire monitoring device comprises an aircraft tire pressure sensor.

15. The aircraft tire monitoring device according to claim 1, wherein the wireless communication interface is configured to listen for a connection request from the remote device when the wireless communication interface is activated.

16. The aircraft tire monitoring device according to claim 1, wherein the wireless communication interface is configured to transmit a connection signal for facilitating connection of the aircraft tire monitoring device to the remote device when the wireless communication device is activated.

17. An aircraft comprising an aircraft tire monitoring device according to claim 1.

18. A method of operating an aircraft tire monitoring device, the method comprising:

operating the aircraft tire monitoring device in a first mode in which a wireless communication interface of the tire monitoring device is periodically activated from an inactive state to be available for connection to a remote device with a first interval between activations; and operating the tire monitoring device in a second mode in which the wireless communication interface is periodically activated from the inactive state to be available for connection to the remote device with a second interval between activations different to the first interval between activations, wherein while in the inactive state the wireless communication interface is not available for connection to the remote device.

19. The method according to claim 18, wherein the method comprises switching from the first mode to the second mode based at least in part on a determination that the remote device is within communicative range, and the second interval is greater than the first interval.

20. The method according to claim 18, wherein the method comprises switching from the first mode to the second mode based at least in part on a status of the remote device.

21. The method according to claim 18, wherein the method comprises operating the aircraft tire monitoring device in a third mode in which the wireless communication interface is periodically activated and available for connection to the remote device with a third interval between activations lower than the first and second intervals.

22. The method according to claim 21, wherein, where the aircraft tire monitoring device is attached to an aircraft in use, the method comprises switching from the first mode to the third mode in response to take-off of the aircraft.

* * * * *